July 26, 1938.  J. A. DRAIN, JR  2,124,849
ARC WELDING
Filed Sept. 30, 1936
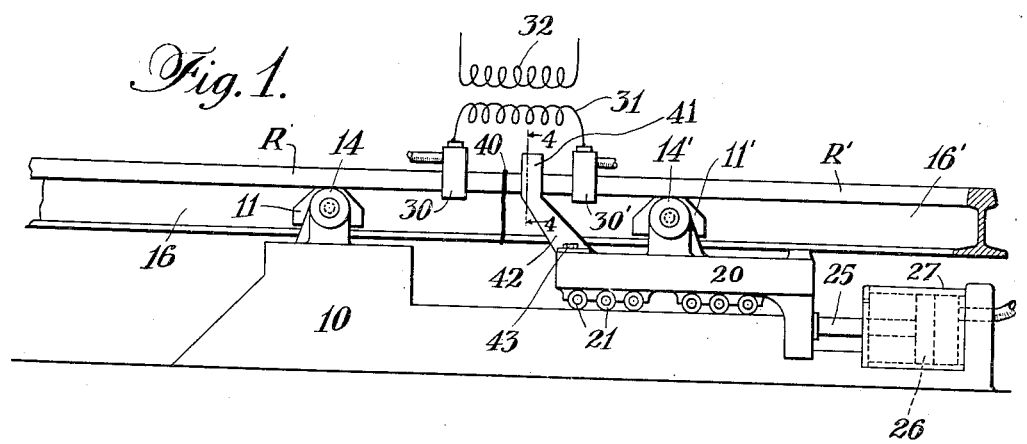
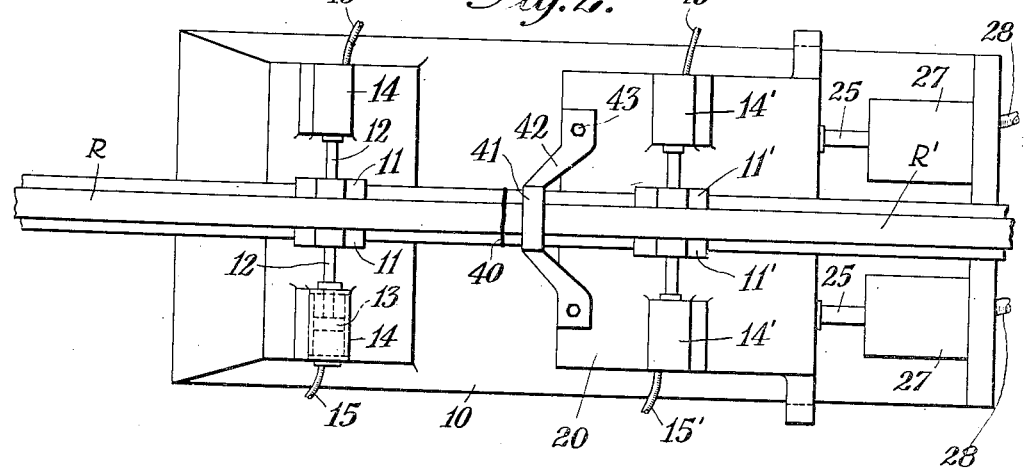
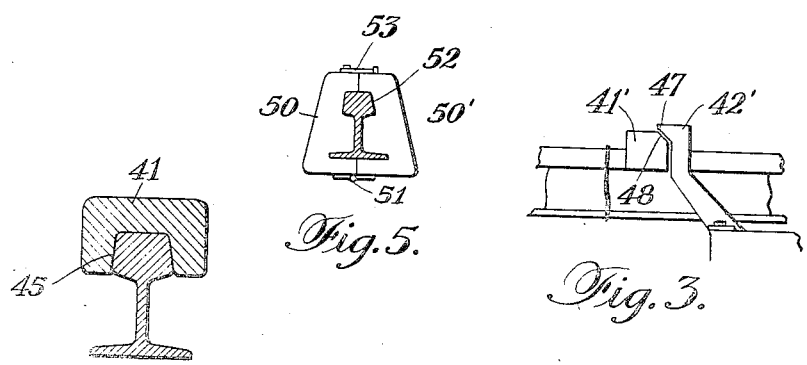
INVENTOR.
James A. Drain, Jr.
BY Joseph H. Lipschutz
ATTORNEY Patented July 26, 1938

2,124,849

UNITED STATES PATENT OFFICE 2,124,849

ARC WELDING

James A. Drain, Jr., Brooklyn, N. Y., assignor to Sperry Products, Inc., Brooklyn, N. Y., a corporation of New York Application September 30, 1936, Serial No. 103,403

7 Claims. (Cl. 29—33)

This invention relates to the art of welding, especially the type of welding known as flash butt welding, and is designed for use particularly in connection with the welding of rails but may be employed in connection with the welding of any members of uniform cross-section. In the flash butt welding process an arc is struck between the surfaces to be joined so that said surfaces are heated to plasticity and then the two members are brought together with considerable force, end to end, to form the weld. During this operation some of the metal is squeezed out to form a bead surrounding the weld and the removal of this bead has heretofore consumed considerable time. Such removal has been effected usually by chiselling off most of the surplus metal while the said metal was still quite hot and then grinding off the remainder after the metal had cooled. It will be seen that this process is time consuming and adds considerably to the expense of the welding process.

It is the principal object of my invention, therefore, to provide means whereby the excess metal surrounding the weld may be quickly and effectively removed without consuming any appreciable time or adding materially to the expense of the welding process.

Further objects and advantages of this invention will become apparent in the following detailed description thereof.

In the accompanying drawing,

Fig. 1 is a side elevation of a welding machine for flash butt welding, showing one form of my invention applied thereto.

Fig. 2 is a plan view of the Fig. 1 device.

Fig. 3 is a side elevation of a modified form of the invention.

Fig. 4 is a section taken substantially on the line 4—4 of Fig. 1.

Fig. 5 is an end view of another modification of my invention.

Referring to the drawing, I have illustrated, largely diagrammatically, a flash butt welding machine particularly adapted for welding rail lengths. This machine comprises essentially a heavy base 10, having mounted thereon a set of clamps 11, said clamps being preferably carried on piston rods 12 connected to pistons 13 operating within fluid pressure cylinders 14 to which fluid pressure such as compressed air from a source not shown, is adapted to be supplied through conduits 15. From this construction it will be understood that when the fluid pressure valve is opened fluid pressure enters cylinders 14 to force the clamps 11 firmly into engagement with the sides of the web 16 of one of the rail lengths R. Because the cylinders 14 are fixed on the base 10, the clamps 11, and, hence, the rail R are held firmly against all movement. The other rail length R' is adapted to be engaged by a similar set of clamps 11' similarly operated from fluid pressure cylinders 14' supplied with fluid pressure from the same fluid pressure source by way of conduits 15'. The cylinders 14' are not fixedly mounted upon base 10 but are carried upon a carriage 20 mounted on rollers 21 for movement upon the base 10 in a direction axially of the rails R, R'. With the clamps 11' firmly in engagement with the sides of the web 16' of rail R', such axial movement of rail R' may be effected by means of piston rods 25 fixed to the carriage 20 and connected to pistons 26 operating within cylinders 27 to which fluid pressure may be supplied from the same source as the fluid pressure which is supplied to cylinders 14 and 14', by way of conduits 28. By this construction the rail R' may be moved axially toward or away from the corresponding end of rail R.

While the various movements have been described above as performed by fluid pressure acting upon pistons in cylinders, it will be understood that other sources of power such as electric motors may be employed, and other clamps, such as cams connected to the motor shafts, may be substituted for those shown.

The flash butt welding process herein employed may now be described. Current clamps 30 and 30' may be connected to the rails R and R', respectively, a short distance back of the rail ends to be welded, and said clamps may be connected to the secondary winding 31 of a transformer having a primary winding 32 and connected to any suitable source of alternating current. With the clamps 11 and 11' firmly in engagement with the respective rails R and R', and the rail ends spaced, the current is applied and rail R' is fed toward rail R until the arc is struck. Several contacts may be necessary before said arc is established, but once the arc is established the ends of the rail are heated and rail R' is slowly fed toward rail R but not into engagement therewith. When the ends of the rails have reached the proper degree of plasticity, substantial fluid pressure is applied to the cylinders 27 to cause rail R' to be brought with considerable pressure into engagement with the end of rail R to form the weld. This causes a certain amount of metal to be forced upwardly around the entire periphery of the weld, forming the well known head, 40.

As set forth in the introduction to this specification, it has heretofore been the custom to chisel off the bulk of the excess metal forming the bead while the metal was still hot and then complete the removal of the metal by grinding after said metal had cooled. By my invention I remove the excess metal in a single operation immediately following the formation of the weld. For this purpose I may mount upon the carriage 20 in fixed relation thereto a die member 41 carried upon a bracket 42 fixed upon the carriage 20 by means such as bolts 43. In the form here shown it is desired merely to remove the bead on the head of the rail and therefore the die 41 is formed as a member having a cutout portion 45 of substantially the same shape as the head of rails R, R'. When the rail R' has been brought into firm engagement with rail R to form the weld, the fluid pressure in cylinders 14' is released so that rail R' is released, and then fluid pressure is applied within the cylinders 27 to cause the carriage 20 to be moved further in an axial direction until the die 41 has swept past the weld into engagement with rail R. In so doing, the die 41 will completely remove the bead on the heads of the rails. If desired, the die 41 may have a cutout portion 45 slightly larger than the shape of the rail head so as to leave a small amount of the excess metal which may then be reduced by grinding.

Instead of fixedly mounting the die member 41 on the carriage 20, said die member may be formed as a separate member 41' designed to be positioned in advance of bracket 42' fixedly mounted on the carriage 20. The said bracket 42' may have a portion 47 inclined and overlying a correspondingly inclined portion 48 on die member 41' so that when the carriage 20 is moved forward the surfaces 47, 48 will tend to press the die member 41 downwardly into engagement with the rail-head and maintain the die in engagement with the rail-head.

It may be desirable to remove the entire bead surrounding the periphery of the weld. This may be desirable to prevent the possibility of excess unwelded metal producing a notch effect which might cause failure of the rail under impact or which might promote the growth of cracks causing "detail fracture", or to permit installation of standard angle bars, or to permit repair of a broken weld. In order to remove the entire bead surrounding the weld I may provide instead of a die 41 or 41' a die such as shown in Fig. 5 and which consists of two portions 50 and 50' hinged together at 51 and having a cutout portion 52 of exactly the contour of a rail section. When the parts 50 and 50' are mounted to surround the rail they are locked in position by any suitable locking means 53. The said members 50 and 50' may be mounted as a unit independent of bracket 42' as shown in Fig. 3. It will be seen that as the unit comprising members 50 and 50' is pushed across the weld, the entire bead surrounding the periphery of the rails at the weld will be removed in a single operation.

While the various forms of the invention described above have been shown and described in connection with the welding of rail lengths it will be understood that it is equally adapted in connection with the welding of metals having cross-sections other than that of a rail, provided that the said cross-sections are uniform.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a flash butt welding apparatus, said apparatus having means for heating to plasticity the ends of the materials to be welded, a fixed support for one of said ends, a movable support for the other of said ends, means for clamping said ends to said supports, means for moving said second support to move said ends together to form the weld and a bead of surplus material surrounding the weld, said movable support being adapted to release the end clamped thereto after said weld is formed, a die having a cutting edge which conforms to the contour of said ends, and means whereby further movement of said movable support, after releasing its respective end, operates said die across the weld to remove the bead.

2. In a flash butt welding apparatus, said apparatus having means for heating to plasticity the ends of the materials to be welded, a fixed support for one of said ends, a movable support for the other of said ends, means for clamping said ends to said supports, means for moving said second support to move said ends together to form the weld and a bead of surplus material surrounding the weld, said movable support being adapted to release the end clamped thereto after said weld is formed, a die positioned in engagement with one of said ends and having a cutting edge which conforms to the contour of said ends, and means whereby further movement of said movable support, after releasing its respective end, operates said die across the weld to remove the bead.

3. In a flash butt welding apparatus, said apparatus having means for heating to plasticity the ends of the materials to be welded, a fixed support for one of said ends, a movable support for the other of said ends, means for clamping said ends to said supports, means for moving said second support to move said ends together to form the weld and a bead of surplus material surrounding the weld, said movable support being adapted to release the end clamped thereto after said weld is formed, and a die positioned in engagement with one of said ends and having a cutting edge which conforms to the contour of said ends, said movable support having means adapted to engage said die upon further movement of said support, after releasing its respective end, to operate said die across the weld to remove the bead.

4. In a flash butt welding apparatus, said apparatus having means for heating to plasticity the ends of the materials to be welded, a fixed support for one of said ends, a movable support for the other of said ends, means for clamping said ends to said supports, means for moving said second support to move said ends together to form the weld and a bead of surplus material surrounding the weld, said movable support being adapted to release the end clamped thereto after said weld is formed, and a die positioned in engagement with one of said ends and having a cutting edge which conforms to the contour of said ends, said movable support having means adapted to engage said die upon further movement of said support, after releasing its respective end, to operate said die across the weld to remove the bead, said last-named means and said die being so formed that said die is pressed into engagement with said ends with increasing pressure during said further movement of said support.

5. In a flash butt welding apparatus, said apparatus having means for heating to plasticity the ends of the materials to be welded, a fixed support for one of said ends, a movable support for the other of said ends, means for clamping said ends to said supports, means for moving said second support to move said ends together to form the weld and a bead of surplus material surrounding the weld, said movable support being adapted to release the end clamped thereto after said weld is formed, a die carried by said movable support and having a cutting edge which conforms to the contour of said ends, said die being so positioned that further movement of said movable support, after releasing its respective end, operates said die across the weld to remove the bead.

6. In a flash butt welding apparatus for rails, said apparatus having means for heating to plasticity the ends of the rails to be welded, means for moving said ends together to form the weld and a bead of surplus material surrounding the weld, a die having a cutting edge which conforms to the contour of the rail head, and means whereby said die is operated across the weld to remove the bead on the rail head.

7. In a flash butt welding apparatus for rails, said apparatus having means for heating to plasticity the ends of the rails to be welded, means for moving said ends together to form the weld and a bead of surplus material surrounding the weld, a die having a cutting edge which conforms to the contour of the rail, and means whereby said die is operated across the weld to remove the bead surrounding the rail.

JAMES A. DRAIN, Jr.